United States Patent

[11] 3,629,680

[72] Inventors William R. Baynes
Palos Verdes Peninsula;
John P. Hiltpold, Manhattan Beach;
William A. Staats, Torrance, all of Calif.
[21] Appl. No. 29,510
[22] Filed Apr. 17, 1970
[45] Patented Dec. 21, 1971
[73] Assignee Mattel Inc.
Hawthorne, Calif.

[54] TOY BATTERY CHARGER
4 Claims, 4 Drawing Figs.

[52] U.S. Cl. ........................................ 320/2,
46/244
[51] Int. Cl. ........................................ H02j 7/00
[50] Field of Search ........................ 46/243 M,
244 R, 202; 320/2, 3, 25, 53, 56; 307/150

[56] References Cited
UNITED STATES PATENTS

| | | | |
|---|---|---|---|
| 2,780,766 | 2/1957 | Hedding et al. | 320/4 |
| 2,518,039 | 8/1950 | Malki et al. | 320/2 X |
| 2,594,988 | 4/1952 | Portail | 320/15 X |
| 2,832,177 | 4/1958 | Mueller | 320/2 UX |
| 3,471,963 | 10/1969 | Tomiyama | 46/243 M |
| 3,340,454 | 9/1967 | Dahl | 320/59 X |
| 3,307,096 | 2/1967 | Lyon | 320/15 |
| 3,414,793 | 12/1968 | Jasperson | 320/2 UX |
| 3,209,230 | 9/1965 | Mas | 320/4 |
| 2,683,956 | 7/1954 | Conte | 46/244 R |
| 3,275,919 | 9/1966 | Decker et al. | 320/2 |
| 3,115,724 | 12/1963 | Clarke | 320/2 UX |
| 3,387,404 | 6/1968 | Appel | 46/39 |
| 3,105,910 | 10/1963 | Chambers | 320/2 X |

Primary Examiner—J. D. Miller
Assistant Examiner—Robert J. Hickey
Attorney—Seymour A. Scholnick ABSTRACT: A battery charger for charging electric motor-powered toy vehicles with self-contained rechargeable batteries, the charger including a self-contained charging battery housed in a simulated vehicle service facility such as, for example, an automotive service station gasoline pump including a normally open electrical push switch connected in series with the charging battery and an electrical charging current delivery cable and connector resembling a fuel dispensing hose and nozzle. The self-contained charging battery has a greater nominal potential than the vehicle's rechargeable batteries and the charger electrical circuitry includes a series connected current limiting resistor to protect the rechargeable batteries from excessive sustained charging current flow.

PATENTED DEC 21 1971
3,629,680
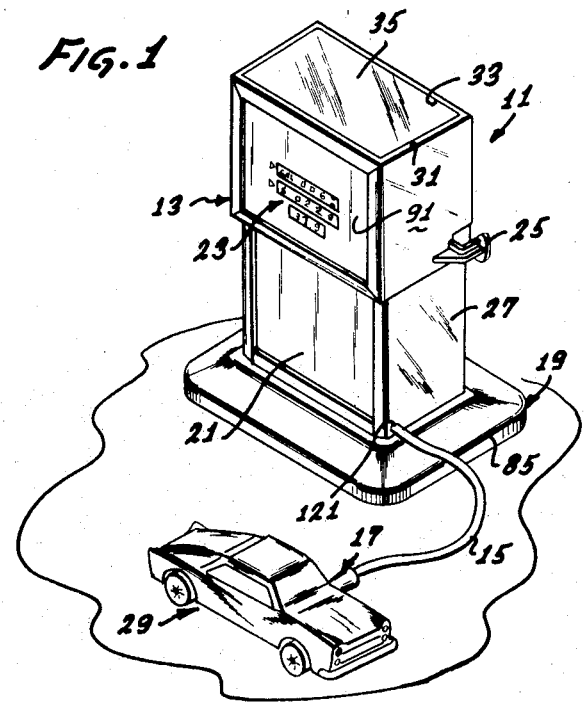
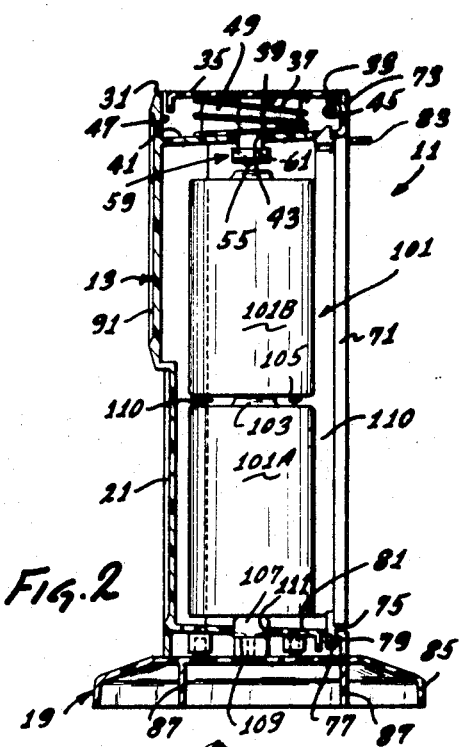
INVENTORS
WILLIAM R. BAYNES
JOHN P. HILTPOLD
WILLIAM A. STAATS
BY Gerald L. Price
ATTORNEY

TOY BATTERY CHARGER

BACKGROUND OF THE INVENTION

The background of the invention will be set forth in two parts.

1. Field of the Invention

The present invention pertains generally to the field of low current battery chargers and more particularly to an improved self-contained battery charger for safely charging miniature rechargeable batteries in toy vehicles.

2. Description of the Prior Art

For many years, the toy industry produced self-powered vehicles using only mechanical spring-type propulsion mechanisms. This was due in part to the relatively heavy weight of the vehicles and the low efficiency of small electric motors usable in such vehicles. More recently, however, more powerful and efficient miniature electric motors have been developed making more advantageous the use of electrical propulsion systems to motivate toy automobiles, trucks, etc.

Still more recently, the toy industry has become interested in the use of subminiature rechargeable batteries such as nickel-cadmium cells for supplying the electrical power needed to activate these new electric motors. Along with this new direction of attention, the industry required suitable battery chargers to supply the necessary charging current for the system. These devices generally took the form of a structure wherein the rechargeable batteries were placed after being temporarily removed from the toys. A later-developed technique was to electrically connect a battery charger to the batteries in the toys by means of an electrical plug and cable.

The latter-mentioned charger could be housed in a structure compatible in appearance with the types of toy vehicles to be serviced. For example, the battery charger could be housed in a service station fuel pump simulated structure of the type depicted in U.S. Pat. No. 3,387,404.

In all the various techniques used to charge the vehicles' batteries, there was the disadvantageous requirement that the battery charger include an expensive transformer and rectifier circuitry which must be connected to an electrical line current outlet. A device of this type is disclosed in U.S. Pat. No. 2,832,177. In this country, this is usually a 115-volt line voltage, but in many foreign countries the line voltage available at service sockets is usually 240 volts, requiring a different transformer. Another disadvantage is the usual requirement of an elaborate and generally costly timing mechanism to control such transformer produced charging power because of the delicate nature as to charging power versus time of charge characteristics of the rechargeable batteries in the toy vehicles.

Although it was heretofore considered impractical to utilize batteries as the source of charging current for self-contained electrically motivated toy vehicles because of the low power capacity of such batteries and the costly and complicated time-control mechanisms though to be necessarily included to prevent battery damage, it has been found that the use of such batteries is indeed practical and no complicated timing arrangement is needed.

SUMMARY OF THE INVENTION

In view of the foregoing factors and conditions characteristic of prior art battery chargers for toy vehicles, it is a primary object of the present invention to provide a new and improved battery charger for use with toy vehicles having self-contained rechargeable batteries.

Another object of the present invention is to provide a relatively simple and inexpensive toy battery charger which does not require connection to a household electrical line current receptacle.

A further object of the present invention is to provide a completely self-contained toy battery charger which incorporates circuitry to prevent overcharging of the miniature rechargeable batteries in toy vehicles and which does not require the removal of such batteries from the vehicles for charging purposes.

Yet another object of the invention is to provide a toy battery charger which utilizes a very simple switching arrangement to control the charging current produced.

Still another object of this invention is to provide a toy battery charger which has high appeal to young persons by simulating an actual automotive service facility.

According to the present invention, a toy battery charger is provided for use with toy vehicles having electronic motor propulsion systems powered by rechargeable batteries and battery charging connectors for accepting charging current from an external source. The charger includes a flexible cable extending from a housing simulating a vehicle service facility, the cable including a plurality of electrical conductors and an electrical connector terminating the electrical conductors and adapted to communicate with the battery charging connectors of the toy vehicles. Also included in the housing is a charging battery having a potential greater than that of the rechargeable vehicle batteries, an electrical normally open momentary push switch and electric circuitry connecting the electrical conductors in series with the charging battery and the switch to complete the charging current circuit path between the charging battery and the vehicles' rechargeable batteries when the switch is manually activated.

The electric circuitry may preferably include a series connected current limiting resistor to prevent damage to the rechargeable batteries by excessive charging current flow.

The features of the present invention which are believed to be novel are set forth with particularity in the appended claims. The present invention, both as to its organizations and manner of operation, together with further objects and advantages thereof, may best be understood by reference to the following description, taken in connection with the accompanying drawing in which like reference characters refer to like elements in the several views.

BRIEF DESCRIPTION OF THE DRAWING

FIG. 1 is a perspective view of a presently preferred embodiment of the invention as it is used to charge the self-contained battery in a toy vehicle;

FIG. 2 is a side cross-sectional view in elevation of the embodiment shown in FIG. 1;

FIG. 3 is a front cross-sectional view of the invention; and

FIG. 4 illustrates schematically the electrical circuitry utilized in the preferred embodiment of the invention.

DESCRIPTION OF THE PREFERRED EMBODIMENT

With reference to FIG. 1, there is shown a toy battery charger 11 in the form of an automotive service facility comprising a service station gasoline pump housing 13, a simulated fuel dispensing hose and a nozzle. Actually, the hose is a two-conductor flexible electrical cable 15 and the nozzle is a male coaxial-type two-conductor electrical plug 17. The housing 13 sits on a base plate 19 for stability and it also may include a front face 21 with realistic digital readout indicia 23 indicating the quantity of fuel delivered and the price of the fuel per gallon. Also, a bent arm member 25 may be provided as shown extending from a side 27 of the structure for allowing the user to "hang up" the nozzle/connector plug 17 when not plugged into a toy vehicle 29 for battery charging purposes.

As can best be seen in FIGS. 2, 3 and 4, the housing 13 further includes a top portion 31 with a rectangular aperture 33 therein in which a manually depressible switch activating platform 35 is mounted flush with portion 31. The platform 35 is spring loaded or biased to the flush position by a coil spring 37 disposed between an underside face 39 of the platform and a recessed fixed partition 41 having a centrally disposed hole 43 therein. For stability of vertical movement, the switch platform 35 is provided with a depending peripheral sidewall 45 which slides along inner wall surfaces 47 of the housing 13.

Depending generally centrally of the underside face 39 of the platform 35 is a switch post arrangement 49 comprising an annular ring portion 51 wherein tilt preventing ribs 53A and 53B and a transversely disposed contact moving member 55 are positioned. The latter member extends beyond the ribs 53 to enter an elongated slot 57 in a metal dual contact arm 59 and held by diagonal depending holding tabs 61 alongside the slot 57. In assembly, the switch platform 35 with its integral depending switch post arrangement 49 is held above the aperture 33 in the housing 13 and the spring 37 positioned about the arrangement 49 before the latter is moved through the hole 43 and the member 55 forced into the slot 57 and there held by the pinching force provided by the holding tabs 61. In this way, it can be seen that the contact arm 59 is forced upwardly against an undersurface 63 of the partition 41 by the biasing force of the spring 37 and at the same time the contact arm 59 prevents the platform 35 from extending above the top portion 31 of the housing 13.

Not shown in great detail but easily understood as to its position, configuration and operation is a battery compartment door 71 in a rear wall 73 of the housing 13. The door 71 is positionable as seen in FIG. 2 in a conforming aperture 75 in the rear wall 73 and removably held in this position by its depending hinge pegs 77 extending into suitable holes 79 in a lower partition 81 in the housing 13 and by a frictional latch tab 83 at the upper portion of the aperture 75 adjacent the upper partition 41. The view in FIG. 2 also best illustrates the reinforced base plate 19 with its outer skirt 85 and its vertical reinforcing ribs 87.

All of the various portions and parts of the housing 13 described thus far, except of course for the metal contact arm 59, may preferably be fabricated from any suitably synthetic material such as a high impact styrene, but any material may be used even though conductive of electrical current, if conventional precautions are utilized to prevent the possibility of a short circuit. Furthermore, any conventional processes such as vacuum molding may be utilized in the fabrication of the invented device, the main portion of the structure being formed in one complete unit or in several cooperating parts to be later assembled. Of course, it may be found preferable to attach, by an adhesive for example, a paper or thin metallic sheet 91 over the front face 21 with the indicia 23 printed thereon instead of painting or printing such indicia directly on the face 21.

Within the housing 13 and captured therein by the door 71 are shown four conventional size "D" carbon-zinc cells 101 in an upstanding configuration with the two side-by-side lower disposed cells 101A supporting two side-by-side upper disposed cells 101B. All cells 101 are poled in the same direction, i.e., the positive terminals 103 of the cells are all at the top thereof and in electrical contact with the negative terminals 105 of the upper positioned cells 101B. The negative terminals 105 of the lower cells 101A are electrically connected together by resting on upstanding contact tabs 107 of a negative contact arm 109. The vertical alignment of the battery cells 101 may be maintained by any vertical cell conforming structure 110 molded in the housing 13 and/or the door 71, and the negative contact arm 109 may be mounted below the lower partition 81 with its tabs 107 projecting through suitably placed slots 111 in the partition 81. In order to provide good electrical contact at all times, the contact arm 109 is provided with a concave upper surface, that is bowed for spring action and is supported only at its center by a base-supported post 113 partially extending into a hole or dimple 115 in the arm 109. It is to be also pointed out that the negative contact tabs 107 are designed such that should the cells be inverted, the battery positive terminal 103 will not make contact with tabs 107 thus preventing the charging of the toy vehicle's cell in reverse polarity.

The flexible electrical cable 15 enters the housing 13 through an aperture 121 in the housing 13 adjacent the contact arm 109 and held by strain relief ribs 122. An electrical conductor 123 of the cable 15 is soldered, welded or otherwise conductively connected to this negative contact arm, while another conductor 125 is electrically connected to one terminal of a current limiting resistor 127, the other terminal of which is connected to the positive contact arm 59 by a conductor 129. The cable 15 is of a conventional type having at least two insulated conductors, and each of these conductors is electrically connected to separate insulated terminals of the conventional, miniature coaxial-type male plug 17 having a sleeve contact 131 and a tip contact 133.

In operation, the switch platform 35 is manually depressed to thereby move two depending positive contact portions 151 at either end of the positive contact arm 59 into contact with the two positive terminals 103 of the cells 101B. This action connects the two positive terminals together and also to the conductor 129. In this position, a positive charging current potential will be present at the tip contact 133, for example, (through the conductors 129 and 125 and the resistor 127) while a negative charging potential will be present at the sleeve contact 131 of the plug 17. The potential will be the sum of the potentials of either one of the two vertically disposed sets of cells 101. Thus, where conventional carbon-zinc cells are used, approximately 3 volts will be available at the plug since each cell provides approximately 1.5 volts. The parallel connected set of vertically disposed cells doubles the current availability at the plug 17.

Where the toy vehicle 29 uses a miniature size 1/3AA nickel-cadmium (ni-cad) cell, for example, with a nominal terminal voltage of 1.2 volts, its terminal potential will rise to 1.5 volts when initially charged by the depression of the switch platform 35. At this instant, the charging current being delivered will be momentarily in excess of 2 amps but will drop very rapidly to some lower figure which is reduced even further by the inclusion of the series resistor 127.

The limitation of the charging current is a function of the internal impedance of the charging battery cells 101 (the internal impedance of the small ni-cad is so small that it may be considered negligible). Where the cells 101 are carbon-zinc, the internal impedance value is approximately 300 milliohms. Should the user of the toy insert alkaline cells as the charging battery, the internal impedance is only about 100 milliohms. Consequently, a higher charging current would flow but for the inclusion of the series connected current limiting resistor 127 which reduces the charging current to a value close to that found with carbon-zinc cells. In the event large ni-cad cells are used in the charger 11, the terminal impedance would even be lower, but excessive current flow would also be limited to approximately that in the first two mentioned cases. Of course, other type sources of charging current may be used such as gel-type sealed lead-acid cells, for example.

The resistor 127 has been found to be especially useful to limit the charging current during continuous charging to prevent rupture of the small ni-cad cells in the toy vehicles should any of the cells not vent properly (a safety feature). Also, the use of this element has the advantage of preventing excess venting of cells which could cause degredation in cell capacity and life. It has been found that a value of approximately 710 milliohms is a presently preferred value, and with a manufacturing tolerance of plus or minus 20 percent on the value of the resistor, the charging current will be kept within an acceptable range.

The timing feature of the charger 11 is the user (usually a child) who depresses the platform 35 on top of the housing 13 after plugging the connector 17 into the vehicles' charging circuit jack. It has been found unlikely that a child will depress the switch platform for more than a minute; this will provide between 3 and 4 minutes running time for a vehicle having a 1/3AA ni-cad cell (about 25 percent charge).

It should be noted that only one set of the series connected vertically disposed cells 101 need be used to operate the charger. However, the additional set connected in parallel with the first will more than double the total charges available. From tests, it has been found that with the use of four size D carbon-zinc cells, approximately 60 charges will be available before the play time-to-charge time ratio is reduced to 1. Considerably more life would be expected using alkaline cells.

This invention has been described in its presently preferred embodiment, but it is clear that it is susceptible to numerous modifications and embodiments within the skill of the routine engineer and without the exercise of the inventive faculty.

What is claimed is:

1. A toy battery charger for use with toy vehicles having electric motor propulsion systems powered by rechargeable batteries, the propulsion systems including battery charging connectors to provide charging current from an external source, characterized by:

a housing simulating a service station gasoline pump.

a flexible cable extending from said housing and including a plurality of electrical conductors, said cable including an electrical connector terminating said electrical conductors and adapted to communicate with the battery charging connectors of the toy vehicles;

charging battery means disposed in said housing, the battery means comprising two pairs of dry cells, the cells of each pair being connected in series and the pairs being connected in parallel whereby said battery means has a potential greater than that of the rechargeable batteries of the toy vehicles;

an electrical, normally open, momentary push switch mounted on said housing and having a manually depressable spring loaded switch-activating platform flush with the top of said housing; and electric circuitry connecting said electrical conductors in series with said charging battery and said switch to complete the charging current circuit path between said charging battery and the vehicles' rechargeable batteries when said switch is manually closed.

2. A toy battery charger according to claim 1, wherein said electric circuitry includes a current limiting resistor connected in series with the series connected conductors, charging battery means and switch.

3. A toy battery charger according to claim 1, wherein the nominal terminal voltage of the rechargeable battery in each of the toy vehicles is approximately 1.2 volts, and wherein the nominal terminal voltage of the series connected cells is approximately 3 volts.

4. A toy battery charger according to claim 2, wherein said current limiting resistor has a value of approximately 710 milliohms.

* * * * *